No. 829,161. PATENTED AUG. 21, 1906.
L. KJERULFF.
WATER LEVEL INDICATOR.
APPLICATION FILED JULY 6, 1905.
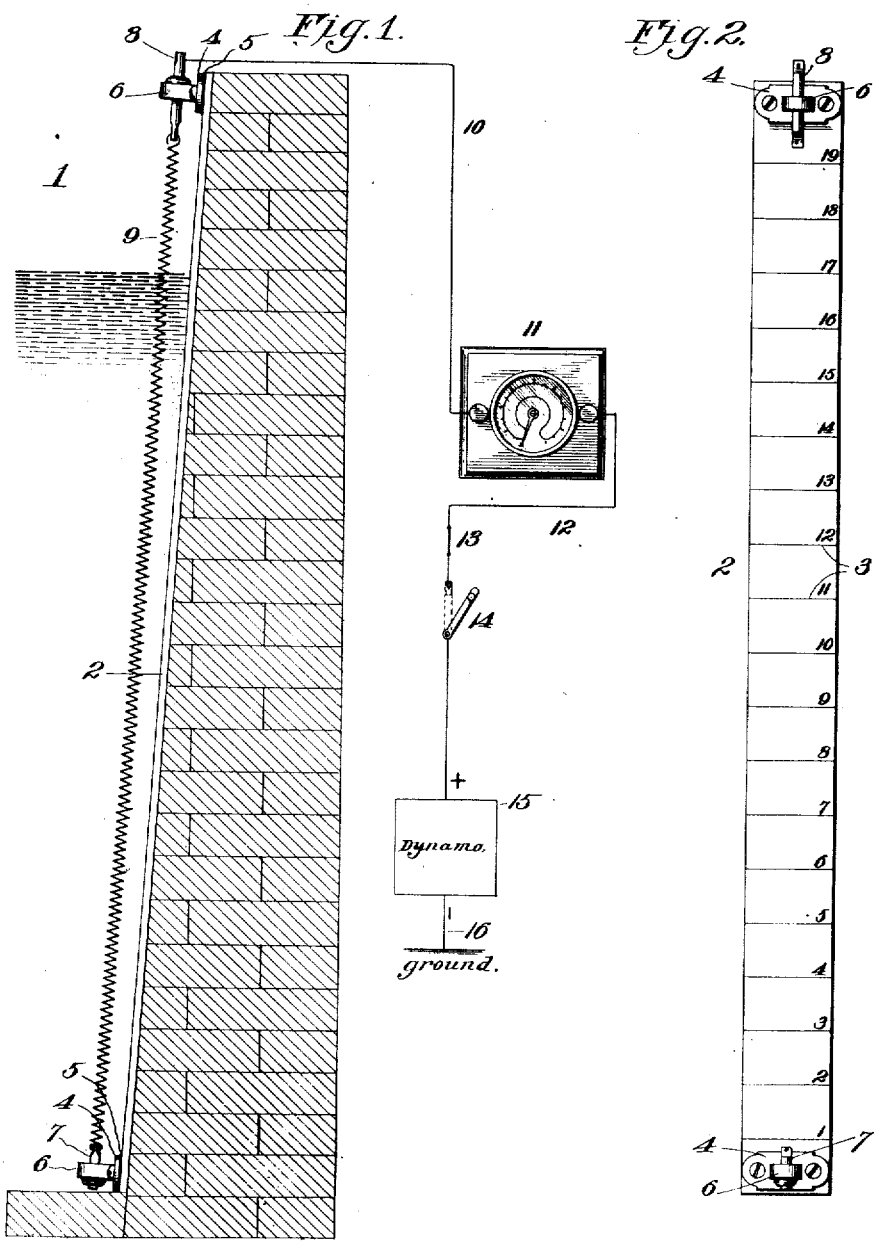
Witnesses:
H. C. Rodgers
J. S. Tuttle
Inventor:
Lawrence Kjerulff.
By George S. Hopf
atty.

UNITED STATES PATENT OFFICE.

LAWRENCE KJERULFF, OF KANSAS CITY, MISSOURI.

WATER-LEVEL INDICATOR.

No. 829,161.   Specification of Letters Patent.   Patented Aug. 21, 1906.

Application filed July 6, 1905. Serial No. 268,424.

*To all whom it may concern:*

Be it known that I, LAWRENCE KJERULFF, a citizen of the United States, residing at Kansas City, in the county of Jackson and State of Missouri, have invented certain new and useful Improvements in Water-Level Indicators, of which the following is a specification.

This invention relates to water-level indicators, and is designed for use in connection with reservoirs, lakes, rivers, &c., for the purpose of automatically indicating the depth of the body of water irrespective of the distance of the indicator from such body of water.

The object of the invention is to produce an efficient and reliable apparatus which utilizes the body of water as one of the conductors in an electric circuit in such a manner that as the water-level rises and falls resistance is cut out of or into the circuit, this variation in current strength being disclosed by an ammeter to the engineer in charge.

To this end the invention consists in certain novel and peculiar features of construction and organization, as hereinafter described and claimed, and in order that it may be fully understood reference is to be had to the accompanying drawings, in which—

Figure 1 is a vertical section of a reservoir equipped with an electric apparatus for indicating the depth of the water in such reservoir. Fig. 2 is a face view of the plate for carrying the resistance-coil.

In the said drawings, 1 indicates the reservoir, and 2 a plate extending from the top to the bottom of the reservoir and provided with indicia 3 to indicate the depth of water, though this indicia has no real bearing on the invention forming the subject-matter of this application.

4 indicates plates secured to and insulated, as at 5, from plate 2 at the lower and upper ends of the latter, and 6 indicates lugs projecting from said plates, the lower lug carrying a pin 7, grounded through the water and the reservoir supply-pipe (not shown) or through the body of water if the latter be a lake or river or equivalent body of water. In this connection it should be stated that plate 2 is not indispensable, as the lugs or supports 6 may be attached to the supports of a bridge-pier or any other structure in the water instead of being attached to the reservoir.

8 is a pin secured to the lug 6 of the upper plate 4, and 9 a conductor of lower conductivity than the water and secured at its opposite ends to pins 7 and 8.

10 is a conductor leading from pin 8 to the ammeter 11 of any suitable character located in the office of the engineer or other person in control of the waterworks plant. From the ammeter a conductor 12 leads through a safety-fuse 13 to break the circuit in the case of a dangerously-high current and an electric switch 14 to a dynamo or other source of electric supply 15, said dynamo or other source of electric supply being grounded by a conductor 16. Now when the circuit is completed by throwing the switch to the position indicated by dotted lines, Fig. 1, the current passes from the dynamo through the switch, fuse, ammeter, conductor 10, and pin 8 to the relatively poor conductor 9, which is preferably in the form of a resistance-coil to allow for expansion and contraction. The current passes down said coil until it reaches the level of the water and then passes through the water, because it offers less resistance than the submerged portion of conductor 9. It then passes to ground and from the ground through conductor 16 to the negative pole of the dynamo.

When there is no current through the ammeter—for instance, when the circuit is broken by the switch—the index-finger of the indicia registers with "0." When said switch is in operative position, the resistance in the path of the current offered, chiefly the unsubmerged portion of coil 9, causes the index-finger of the ammeter to move and indicate by its new position the depth of the body of water, the index-finger increasing its distance from its initial point as the water-level falls and uncovers a greater portion of the conductor 9. This results in introducing a greater resistance in the path of the current, and consequently in reducing in that proportion the strength of the current. As the water-level rises the reverse is true—that is to say, the resistance in the path of the current is diminished and the index-finger of the ammeter consequently moves toward its initial position.

An apparatus of this character for reliably indicating the depth of the water will prove not only convenient in cities where the water-reservoirs are located at a comparatively great distance from the power plant or engineer's office and avoid the necessity which now exists in many plants of sending inspectors at frequent intervals to the reservoir to ascertain the depth of the water; but it wil also prove of great importance in those districts which are frequently devasted by floods, so that precautions may be taken to reduce the loss incident to such floods as far as possible. It will prove of practical value not only in the locality where the electric indicator is in service, but to the districts at a remote distance, as authorities in charge of the apparatus may thereby be enabled to telegraph to the remote places liable to be affected, and thus enable them to take precautionary steps.

From the above description it will be apparent that I have produced an electric water-level indicator possessing the features of advantage enumerated as desirable in the statement of the object of invention and which obviously may be modified in some particulars without departing from the principle of construction involved.

Having thus described the invention, what I claim as new, and desire to secure by Letters Patent, is—

An apparatus for indicating the height of a body of water consisting of insulated lugs secured respectively at the bed of the water and above the same, pins carried by said lugs, a resistance-coil secured to and extending between the said pins, a grounded generator, a meter, and electrical connections between the generator and the meter, and between the meter and the upper pin.

In testimony whereof I affix my signature in the presence of two witnesses.

LAWRENCE KJERULFF.

Witnesses:
H. C. RODGERS,
G. Y. THORPE.